June 27, 1961
H. E. BASS ET AL
2,989,990
VALVE
Filed July 9, 1959
7 Sheets-Sheet 1
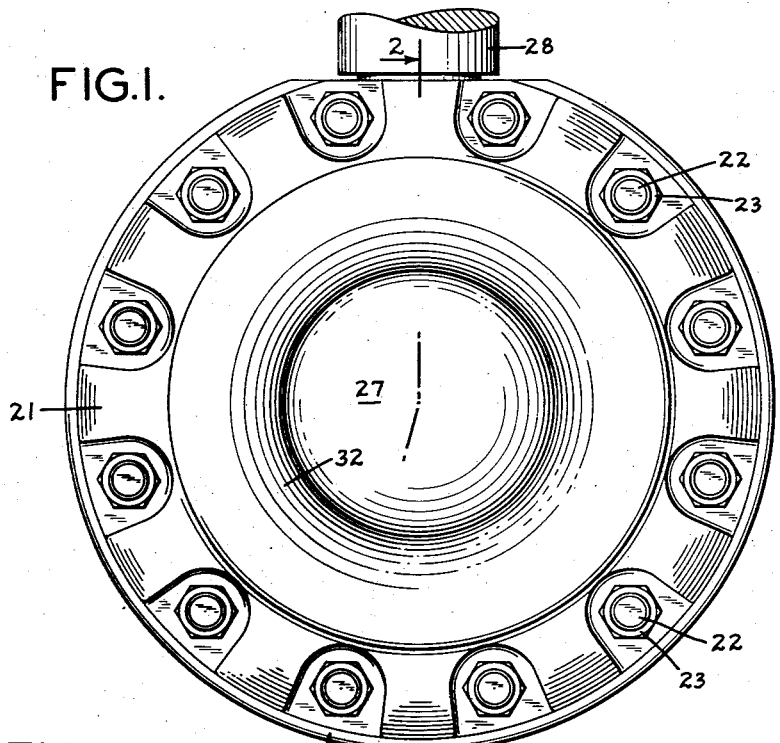
FIG.1.
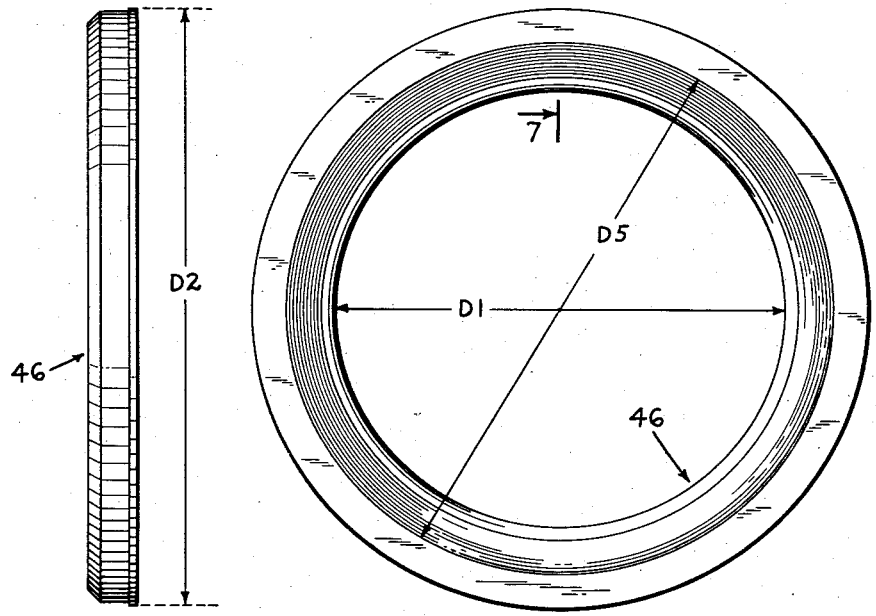
FIG.4.
FIG.5.

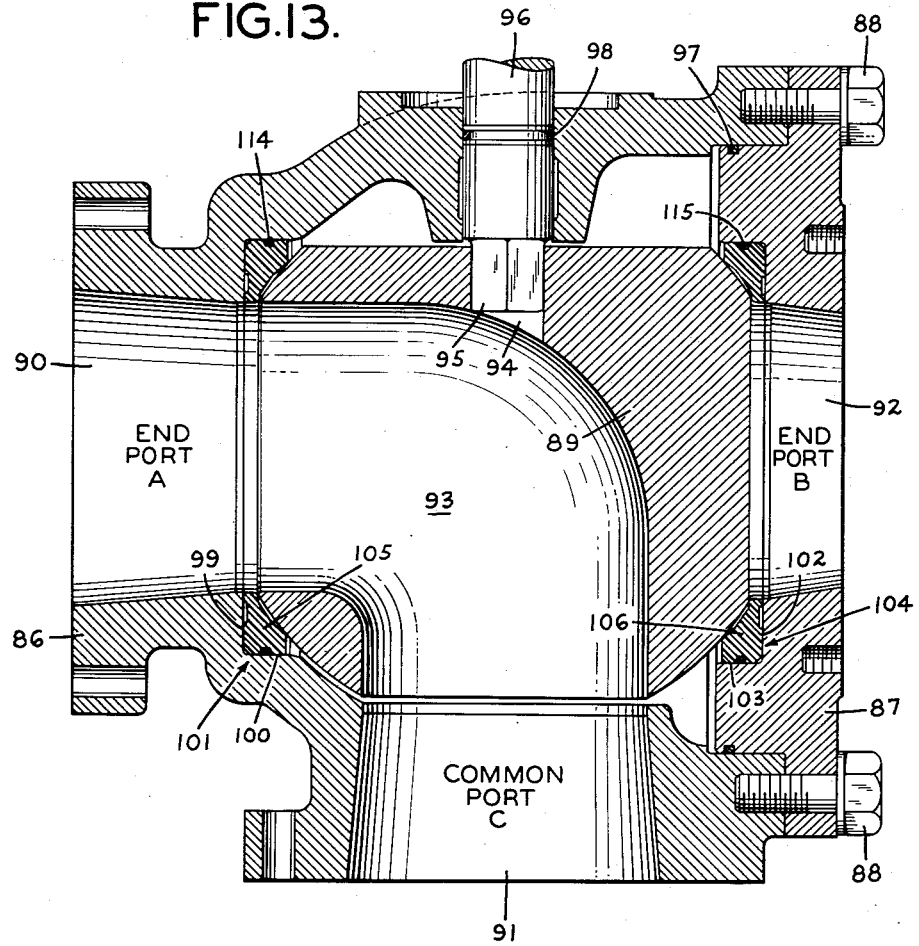

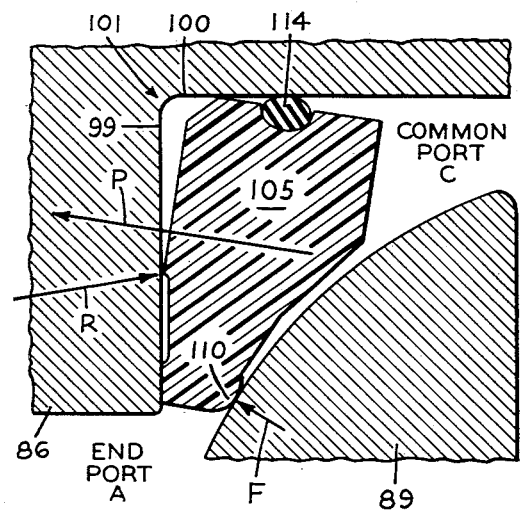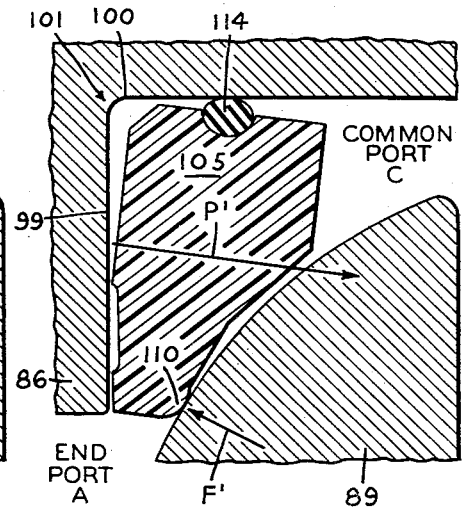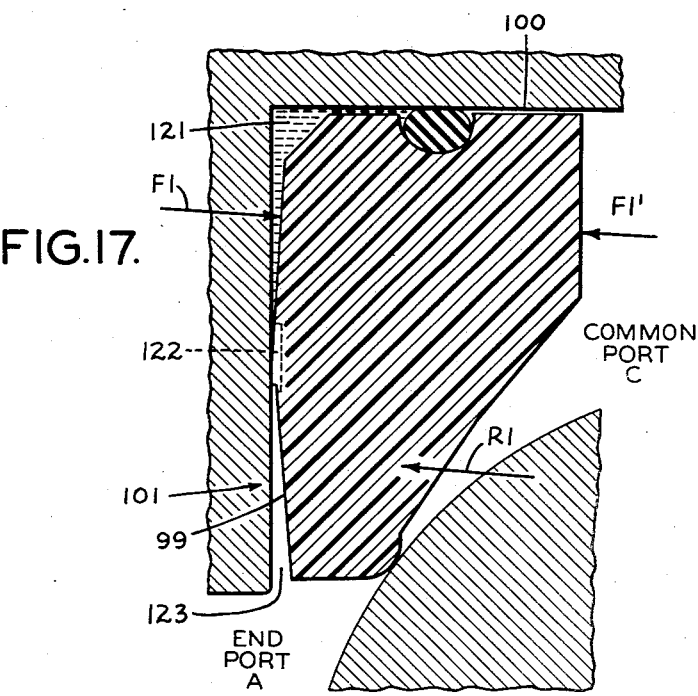

United States Patent Office 2,989,990
Patented June 27, 1961

2,989,990
VALVE
Harold E. Bass, Gales Ferry, and Robert F. White, Stonington, Conn., assignors to General Dynamics Corporation, New York, N.Y., a corporation of Delaware
Filed July 9, 1959, Ser. No. 826,048
22 Claims. (Cl. 137—625.42)

The present invention relates to valves and more particularly to ball valves of the type intended to control the flow of liquids under substantial pressure.

Ball valves having a self-centering or floating ball and especially such ball valves of the type intended to control the flow of liquids under substantial pressure and which use flexible seat seals have been subject to a number of disadvantages, including rapid wear of the seat seals, high torque requirements for operation of the valves, and poor sealing action under certain operating conditions.

The principal object of the present invention has been the provision of a novel and improved ball valve construction which affords greatly improved performance characteristics and which overcomes many of the deficiencies of ball valves heretofore used.

Another object of the invention has been the provision of a novel and improved ball valve which can be used with advantage under severe operating conditions and over wide pressure ranges such as are encountered in sea water valves on submarines designed for deep submergence.

A further object of the invention has been the provision of a novel and improved ball valve which will maintain a tight seal at low pressures following a high pressure application and which will continue to maintain a tight seal at low pressures after repeated cycles of high and low pressure application.

Still another object of the invention has been the provision of a novel and improved three-way ball valve.

A further object of the invention has been the provision of a novel and improved ball valve in which a self-cleaning action is provided to remove solid particles which accumulate between the back side of the seat seal and the main body of the valve housing.

A further object of the invention has been the provision of a novel and improved ball valve in which damage to the seat seal caused by water hammer is prevented.

Still another object of the invention has been the provision of a novel and improved ball valve in which radial expansion of the seat seal caused by hoop stresses exerted thereon when the valve is closed is controlled.

Another and important object of the invention has been the provision of a novel and improved seat seal for use with ball valves.

Yet another object of the invention has been the provision of a novel and improved seat seal especially adapted for use with three-way ball valves.

Another important object of the invention has been the provision of a novel and improved seat seal which will maintain desired sealing contact with a ball despite substantial tolerance variations in seat and ball size.

Other and further objects, features and advantages of the invention will appear from the following description.

The invention will now be described in greater detail with reference to the appended drawings, in which:

FIG. 1 is a front elevational view of one form of valve construction embodying the principles of the invention;

FIG. 4 is a side elevational view of one of the seat seals of FIG. 2;

FIG. 5 is a front elevational view of the seat seal of FIG. 4;

FIG. 13 is a sectional view, similar to FIG. 2, showing a three-way valve constructed in accordance with the invention;

FIG. 16A is a schematic force diagram illustrating the sealing action in a three-way ball valve of the type shown in FIG. 13 with pressure from the common port;

FIG. 16B is a diagram similar to FIG. 16A for pressure from an end port; and

FIG. 17 is a schematic force diagram for a modified seat seal of a three-way ball valve constructed in accordance with the invention.

Figure 2:
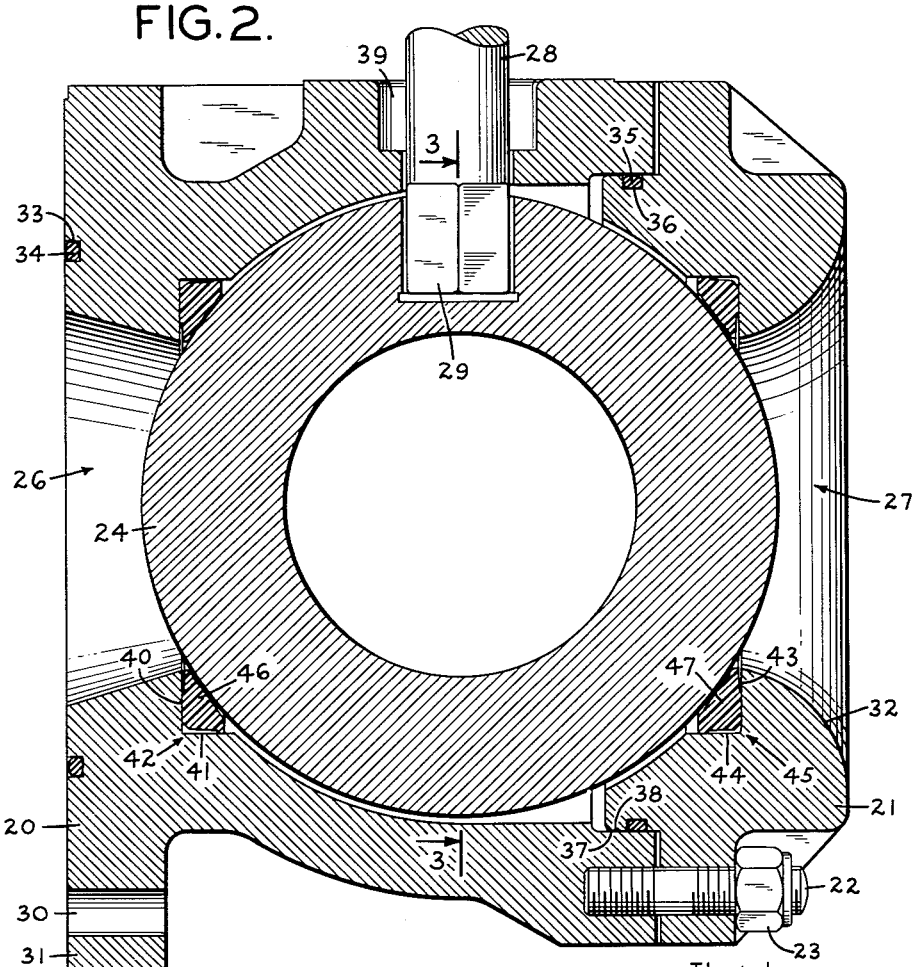
FIG. 2 is a sectional view taken along line 2—2 of FIG. 1.

Referring now to the drawings, and more particularly to FIGS. 1-7, a generally cylindrical valve body is shown at 20 and a corresponding valve bonnet at 21, the bonnet 21 being attached to the valve body 20 by means of a series of peripherally spaced studs 22 and nuts 23. Shims may be provided between the valve body and bonnet to secure desired spacing, as is customary. The valve body 20 and bonnet 21 define a spherical cavity which contains a ball 24 serving as the valve closure element. The ball 24 is of the self-centering or floating type.

Figure 3:
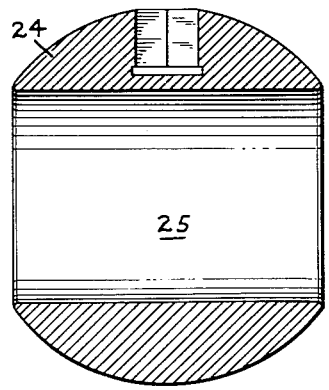
FIG. 3 is a detail sectional view of the ball of the valve of FIGS. 1 and 2 taken along the line 3—3 of FIG. 2.

As best shown in FIGS. 2 and 3, the ball 24 is generally spherical in shape and contains a passage 25 which, in an appropriate position of the ball, communicates with a port 26 provided in the end of the valve body 20 and a port 27 provided in the end of the bonnet 21. As best shown in FIG. 3, the ends of the ball are removed to afford the communication described between the passage 25 and the ports 26 and 27.

The top of the ball is provided with a hole, which may be square, and which accommodates an operating stem 28 having a correspondingly shaped end 29. The operating stem 28 may be rotated by any convenient means, such as a manually operable handle or hydraulic mechanism (not shown). Rotation of the operating stem 28 through an arc of 90° will rotate the ball between positions in which the passage 25 provides free communication between the ports 26 and 27 and in which no communication is provided between these ports.

In a typical installation, the port 26 might communicate with either a source of liquid under pressure or a reservoir for receiving liquid under pressure, while the port 27 would communicate with such a reservoir or source, as the case might be. As will be evident from the discussion below, the valve is so constructed that either port may be the upstream port and either may be the downstream port. In the specific construction illustrated, the left end of the valve body (FIG. 2) is intended to be connected to the flange (not shown) of a suitable pipe fitting by means of peripherally spaced studs and nuts (not shown) acting in peripherally spaced holes 30 provided in a radially extending flange extension 31 of valve body 20. The right end of the valve bonnet 21, as shown in FIG. 2, is not intended for a similar connection because of the rounded surface 32. But the surface 32 could easily be made to correspond to the valve body construction to permit connection to the flange of a pipe fitting.

The valve body 20 is provided with an annular slot 33 which contains an O ring gasket 34. A similar O ring gasket 35 is provided in an annular slot 36 provided in valve bonnet 21. The O ring 34 is intended to afford sealing between the mating surfaces of the valve body 20 and the adjacent pipe fitting flange (not shown), while the O ring 35 affords sealing between an annular shoulder 37 of valve body 20 and a corresponding annular shoulder 38 of valve bonnet 21.

Operating stem 28 acts in a circular hole 39 provided in the top of valve body 20. The upper portion of the hole 39 is of enlarged diameter (as shown in FIG. 2) to accommodate a bushing (not shown) in which the stem 28 acts. The bushing should be provided with a gasket (for example, an O ring such as 34 and 35) to effect sealing between the bushing and the valve body 20. A gasket should also be provided to effect sealing between the stem 28 and the bushing.

As shown in FIG. 2, valve body 20 is provided with an annular radially extending surface 40 inwardly of the port 26 and an annular longitudinally extending surface 41 extending inwardly from the end of the surface 40. The surfaces 40 and 41 are disposed at right angles to each other, but the actual corner therebetween is preferably slightly rounded. The surfaces 40 and 41 form an annular valve seat 42. Valve bonnet 21 is provided with similar surfaces 43 and 44 affording a similar (preferably identical) but oppositely disposed valve seat 45 inwardly of the port 27. The seats 42 and 45 are adapted to support similar (preferably identical) annular valve seat seals 46 and 47. Since only the downstream seat seal is required to seal at high pressures, the seat seals may be of different construction, but for convenience and to permit either valve port to be the downstream side, the seat seals are preferably identical.

The valve parts, other than the seat seals 46 and 47, may be made of any convenient materials. For example, for submarine sea valve service the ball, valve body and valve bonnet might be made from a nickel-copper alloy.

But the material from which the seat seals 46 and 47 are made should be chosen with particular care. Thus this material should have substantial tensile strength, substantial flexural stiffness and hardness and an ability to resist cold forming while nevertheless affording a good seal. The modulus of elasticity is preferably at least $0.2 \times 10^6$ pounds per square inch, and it is desirable that it be higher. At the present time the best known material is nylon impregnated with molybdenum disulfide, sold under the designation "Nylatron GS" by Polymer Corporation of Pennsylvania, of Reading, Pa. Another example of a suitable material for the seat seals is a glass filled nylon with or without molybdenum disulfide impregnation, for example, the products sold by Fiberfill Corporation of Warsaw, Ind., under the designation "Nylatron–G" and "Nylatron–G–MS," respectively. Still another example of a satisfactory material is a glass-reinforced nylon molding compound sold by Belding Corticelli Industries under the designation "BC I Nylon Resin LX–1115 F." This product exhibits a modulus of elasticity of about $1.13 \times 10^6$ p.s.i. and a tensile strength of 14,000 p.s.i. Another example of a material which can be used, although not considered to be as satisfactory as "Nylatron GS" is "Kel–F" which is a polymer of trifluorochloroethylene sold by M. W. Kellogg Co.

Where the seat seal material is hygroscopic, as in the case of "Nylatron GS," it should be moisture conditioned to a substantial moisture equilibrium so that it will not swell appreciably or decrease in strength appreciably under operating conditions.

The configuration and dimensions of the seat seals will depend upon the pressures against which they are required to seal, the seat seals for the valve of FIGS. 1–7 being considered low pressure seals. By low pressures in this case is meant pressures less than about 1500–2000 p.s.i.

Figure 7:
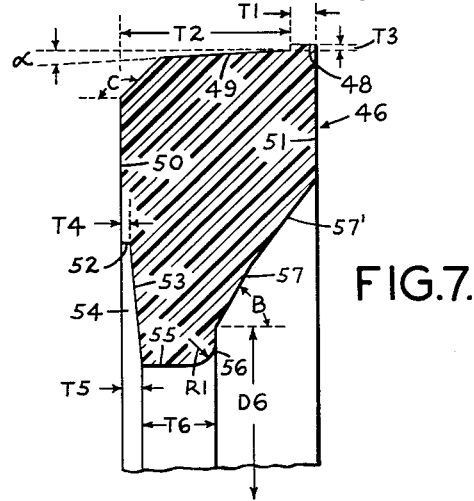
FIG. 7 is an enlarged partial sectional view taken along the line 7—7 of FIG. 5.
Figure 6:
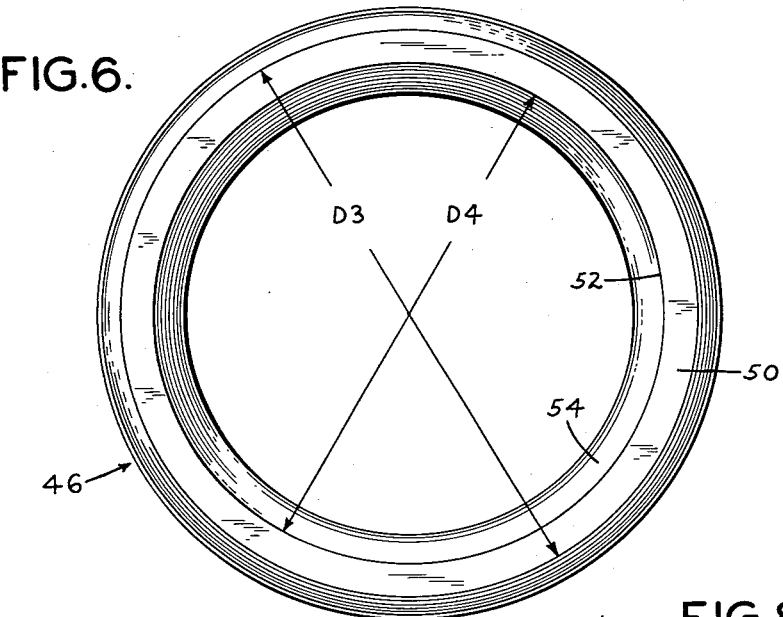
FIG. 6 is a rear elevational view of the seat seal of FIG. 4.

The seat seal 46 (the seal 47 being identical) is shown in detail in FIGS. 4–7 and is annular in shape, having an internal diameter D1 equal to the diameter of the port opening in the valve body and an outer diameter D2 approximately equal to the diameter of the annular surface 41 of the valve seat 42. As is best shown in FIG. 7, the maximum outer diameter is only provided over a short part of the seal thickness represented by the flange portion 48. The main body of the outer diameter (extending outwardly of the valve) is tapered as shown by the angle α. The outermost portion of the outer diameter may be chamfered, as shown by the angle C, to facilitate seating of the seal in the seat.

The outer or rear annular surface 50 ("outward" or "rear" in this sense meaning away from the ball) is substantially parallel to and, under normal preload conditions, the inner corner thereof contacts the surface 40 of the valve seat 42. The opposite surface 51 is parallel to surface 50.

Surface 50 ends at a shoulder 52. A surface 53 extends inwardly from the shoulder 52 at an angle determined by the dimensions T4 and T5, forming a chamber 54 which is trapezoidal in cross section and annular in shape. The inner diameter of the seal is formed by a surface 55 which, under normal preload conditions, is substantially parallel with the surface 48. The inner end of the surface 55 is curved on a radius R1, forming a raised annular surface or bead 56 which joins surface 55 and a surface 57, the latter making an angle B with respect to a plane transverse to the cross section of the seal. The surface 57 meets a surface 57' which is inclined at a slightly smaller angle, e.g., 4° less than angle B, the surface 57' joining the surfaces 57 and 51. The difference in angle of inclination between surfaces 57 and 57' is to ensure that the ball does not contact the center of the inclined portion of the front face and also to provide a more concentrated loading at the area of contact between the ball and the surface 57'.

By way of example only, and in no sense by way of limitation, typical dimensions for a 7" low pressure valve might be as follows:

| | | | |
|---|---|---|---|
| D1 | 7" | T1 | 0.1" |
| D2 | 9.5" | T2 | 0.65" |
| D3 | 9.1" | T3 | 0.15" |
| D4 | 8" | T4 | 0.02" |
| D5 | 8.5" | T5 | 0.07" |
| α | 2° | T6 | 0.34" |
| B | 58° | R1 | 0.1" |
| C | 45° | | |

These dimensions and their relative magnitudes will, of course, vary widely dependent on many factors such as size of the valve, the tensile and compressive strengths and modulus of elasticity of the seal material, and the maximum design pressure. For example, the thickness T6 of the seal at the inner diameter D1 need only be sufficient to insure that the total cross sectional area of the seal have sufficient torsional stiffness to maintain positive contact with the ball 24 under low pressure conditions (pressures well below the rated pressure).

Figure 10:
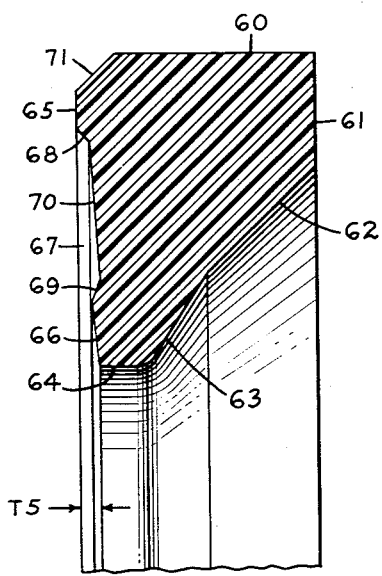
FIG. 10 is an enlarged partial sectional view taken along the line 10—10 of FIG. 8.
Figure 8:
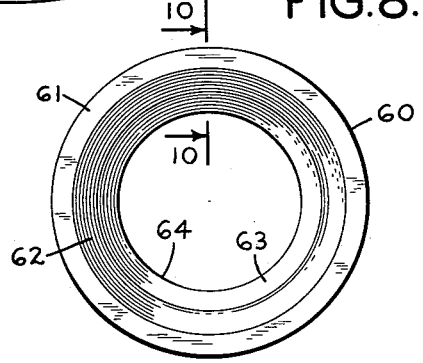
FIG. 8 is a front elevational view of a modified form of seat seal in accordance with the invention.
Figure 9:
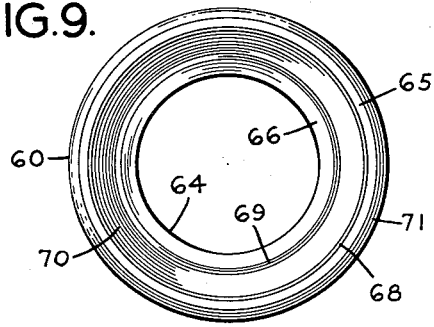
FIG. 9 is a rear elevational view of the seat seal of FIG. 8.

FIGS. 8, 9 and 10 illustrate a modified type of seat seal which is adapted for use with higher maximum pressures than the seat seal of FIGS. 4–7, e.g., pressures up to 4500 p.s.i. or more. As best shown in FIG. 10, the outer diameter seal surface 60 (corresponding to surface 49) is disposed at right angles to the front surface 61 (corresponding to the surface 51), no flange corresponding to the surface 48 being provided. The ball contacting surfaces 56 and 57 of FIG. 7 are replaced in FIG. 10 by two angled surfaces 62 and 63, which might, for example, be disposed at respective angles of 45° and 60° with respect to the horizontal in FIG. 10. The junction of surface 63 and inner diameter surface 64 is on a very short arc, unlike the relatively wide radius arc afforded by surface 56 of FIG. 7.

The annular surface 65 corresponds to the surface 50 and is parallel to the surface 61. The back side bearing surface 66, which corresponds to the annular bearing area formed by that portion of the surface 53 located adjacent the inner diameter of the seal, is disposed at a slight angle with respect to surface 65 to afford a maximum axial spacing dimension T5, the determination of which will be described hereinafter. The surfaces 65 and 66 are joined by an annular chamber 67 (corresponding to the chamber 54) formed by shoulders 68 and 69 and surface 70 which is parallel to the surface 66. The junction of surfaces 60 and 65 is chamfered as shown at 71.

The operation of the valve and seat seal of the invention can conveniently be described in connection with the diagrammatic illustrations of FIGS. 10A and 10B. In these figures the surfaces 40' and 41' correspond to the surfaces 40 and 41, respectively, of FIG. 2 which form valve seat 42, and the ball 24' corresponds to the ball 24. However, the seat seal 72 is intended to represent a seal of the type shown in FIGS. 8–10, but the operation is essentially the same for seals of the type shown in FIGS. 4–7.

Figure 10A:
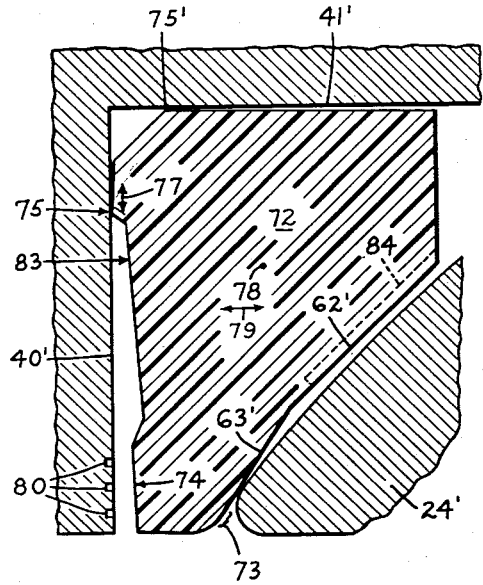
FIGS. 10A and 10B are diagrammatic views illustrating the operation of the valve and seat seal of the invention.
Figure 10B:
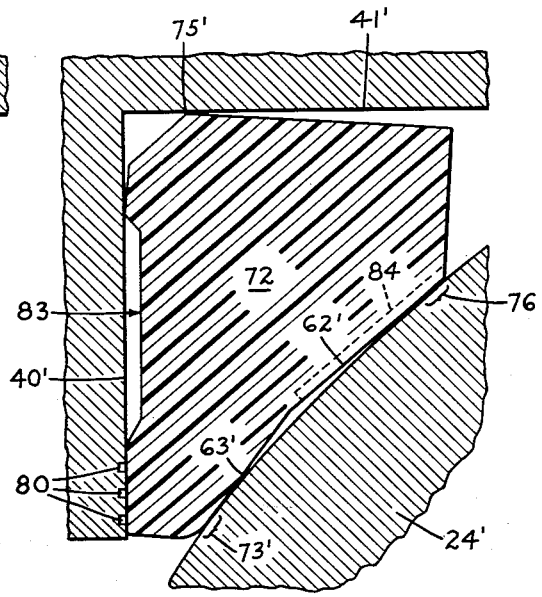

FIGS. 10A and 10B show the same elements but in different operating conditions. In these figures the seat seal 72 is intended to represent the downstream seat seal so that fluid pressure (when present) can be considered as being exerted against ball 24' in a sense to urge the ball toward the seal 72. In FIG. 10A the valve is open so that the fluid pressure acting on the seat seal 72 through the ball 24' is either zero or some relatively small value. Hence the seat seal 72 is substantially in its preload position, i.e., the position into which it is forced by the conventional preloading effected by tightening the nuts 23. The amount of tightening required to achieve the desired preload is not critical because the flexibility of the seat seals will accommodate considerable variation while maintaining a constant preload. In the preload condition (but with the valve closed), the ball 24' contacts the front side bearing area 73 of surface 63' but does not contact the remaining area of surface 63' or surface 62'. The bearing area 73 is preferably relatively small, but will be greater for higher values of preload. The amount of preload placed upon the seals is dependent upon the amount of wear and creep which the seals will undergo during their lives. Although wearing tends to be more or less constant, creep is greatest during the early life of the seals until the seal material becomes strain or work hardened.

With seals of the type shown in FIGS. 4–7, the front side bearing area lies along the curved surface or lip 56. In general, it is not practical to use such a pronounced lip for high pressure valves and hence the corresponding surface for the high pressure seal is not protuberant. This surface occurs at the rounded junction of the surfaces 63 and 64.

In FIG. 10A the rear or back side bearing area 74 of the seat seal 72 is spaced from the seat surface 40', the maximum spacing being designated by the dimension T5 in FIGS. 7 and 10. The dimension T5 (prior to preloading) is preferably equal to the sum of the manufacturing tolerances (maximum) of the corresponding portions of the valve seat, seat seal and ball multiplied by a factor up to about 3 to 4. The dimension T5 decreases after preloading and may even substantially disappear with an appropriate accumulation of manufacturing tolerances. However, even if this dimension decreases substantially to zero under preload, from a sealing standpoint spacing still exists since fluid can easily pass by the bearing surface until a substantial load is applied. This rear side bearing area 74 corresponds to the surface 66 of FIG. 10, while the front side bearing area corresponds to the junction of the surfaces 63 and 64.

As the valve is closed through rotation of the ball 24', the seat seal 74 is subjected to a torsional twisting force transmitted thereto from the ball. This torsional twisting force may conveniently be considered as acting about the point 75 as a fulcrum, although, strictly speaking, it would be more accurate to refer to twisting about the centroid or center of twist. Actually, the fulcrum is a circular line representing the locus of the various points 75 about the periphery of the seat seal, but it is convenient to consider the seal operation from the point of view of a single cross section. The seal operation is a summation of the operations of all of the cross sections.

The torsional twisting of the seat seal continues until the rear side bearing area 74 makes a sealing contact with the seat surface 40'. This sealing contact can occur at any desired proportion of full load pressure on the ball, but preferably the contact will occur when the fluid pressure is about $1/10$–$1/5$ of its rated full load value. The seat seal is, of course, subjected to a bending stress during the torsional pivoting, but this stress is relatively small because it does not increase with increasing load after the back side bearing area 74 makes sealing contact with the seat surface 40'. Hence the elastic limit of the seal material is not exceeded and there is no permanent deformation of the seal. Thus the valve may be caused to experience repeated cycles of operation and still maintain a good sealing action at low pressures as well as at high pressures. Excessive bending of the seat seal would tend to result in permanent deformation and hence in leakage at low pressures. At low pressures sealing is afforded by contact between the ball and the seal in the area 73 and between the fulcrum 75 and the surface 40'.

In the open valve position illustrated in FIG. 10A, no contact is afforded between the ball 24' and the seat seal surface 62'. But, as the valve is closed, motion of the ball 24' under the fluid pressure and torsional twisting of the seat seal cause contact to occur within the area 76. The contact area increases with the load, the full contact area 76 being in contact with the ball at full load. Preferably, contact between the ball 24' and the surface 62' occurs at substantially the same load as contact between the rear side bearing area 74 and the surface 40'.

Because of the constraint afforded by the seat walls, the fulcrum point 75 can move only in a vertical direction, and it moves a small distance radially toward the seat surface 41' along the wall 40' (FIG. 10A) as load is placed on the seat by fluid pressure acting on the ball 24'. The vertical motion of the fulcrum point 75 is indicated by the line 77. During the twisting action the centroid or center of twist of the seat seal, here designated 78, moves in a horizontal direction (toward the back side with increasing load), as indicated by the line 79, because of the vertical spacing between the centroid and the fulcrum point. If hoop stretching occurs, as discussed below, the centroid 78 moves vertically toward the seat surface 41'. Hoop stretching increases the elasticity of the seat seal, providing better sealing action between the ball and the seal, especially in high pressure valves.

The seat seal cross-sectional area should be sufficient to withstand the flexural stress resulting from torsional twisting of the seal, the compressive stress resulting from thrust of the ball upon the seal and the tensile stress resulting from hoop stretching of the seal, i.e., stretching in a radial direction. To prevent the hoop stresses within the seal from exceeding the elastic limit of the seal material, a portion of the outer periphery of the seal may be arranged to come into restraining or confining contact with the seat before the elastic limit of the seal is reached. Such restraining contact is afforded by the point 75' (FIGS. 10A and 10B). The point 75' contacts the surface 41' because of hoop stretching and effectively limits radial expansion of the seal before the elastic limit of the seat seal material is exceeded. Radial expansion of the seat seal may also be controlled by providing concentric grooves in that portion of the valve seat which contacts the back side bearing area of the seal. Such grooves, shown, for example, at 80 in FIGS. 10A and 10B, increase the frictional force between the valve seat and the seal. "Elastic limit," as used herein, should be considered as referring to a practical working stress which will afford a reasonable valve life.

Figure 10C:
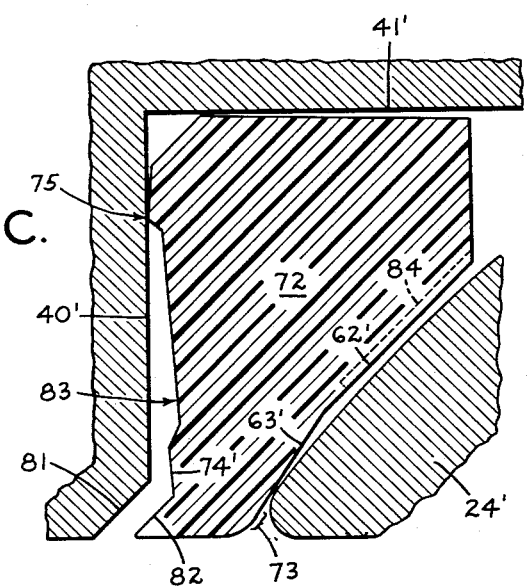
FIG. 10C is a view similar to FIG. 10A but showing a modified form of construction.

Hoop stretching can also be limited by relieving the surface of the valve seat and providing the seat seal with a corresponding configuration, as illustrated in FIG. 10C. In FIG. 10C, the seat surface 40' is relieved as indicated by the reference numeral 81 and the seat seal 72 is provided with rearwardly extending lip 82 disposed at a corresponding angle and arranged so that the lip 82 and the remainder of the back side bearing area, designated 74', contact the surfaces 81 and 40', respectively, at the same time, which contact will occur under a load as discussed in connecton with FIG. 10A.

When the ball valve is in an open position, solid particles present in the fluid tend to collect between the rear side of the seat seal and the seat provided in the housing. These solid particles have been found to become wedged between the housing and the seal and eventually to become embedded in the seal. When this occurs, an annular ridge is built up on the back side of the seal which prevents proper seal functioning. To overcome this problem, there is provided a relief chamber in the back side of the seat seal between the fulcrum point and the inner end of the back side bearing area or, in a seat seal construction of the type shown in FIG. 7, between the fulcrum point and the seal inner diameter. This relief chamber is designated 83 in FIGS. 10A, 10B and 10C, 67 in FIG. 10, and 54 in FIG. 7. As the valve is closed (compare FIGS. 10A and 10B), a pumping action is set up as a result of the torsional pivoting of the seat seal and the consequent rearward motion of the back side bearing area. This pumping action forces the solid particles out of the relief chamber into which they had accumulated while the valve was open.

With seat seals of the type shown in FIGS. 4–7 in which the ball contacts the raised annular surface or bead 56, an additional action takes place which aids the pumping action. Thus, with such a bead, as the ball is moved toward open position, the seat seal experiences a pronounced rapid movement or "snap" when the force exerted on the ball is insufficient to maintain the back side bearing area in contact with the valve seat. This snap action stirs up previously deposited solid particles which may not have been pumped out upon the preceding closing of the valve and facilitates their removal upon the succeeding closing of the valve.

In valves intended to control high pressure liquid flows, the initial or short time torque and the long time torque required to open the valve under high pressure conditions are important figures of merit and should be as low as possible. When using a molybdenum disulfide filled nylon or other material for the seat seal which exhibits the property of a decreasing coefficient of friction for increasing loads, a lower initial torque is obtained by maintaining a minimum bearing or contact area between the seat seal and the ball. Moreover, plastic materials flow when stressed so that when the ball is forced against the seat seal for any substantial length of time a certain amount of microscopic plastic flow occurs, causing the seat seal material to flow into the cracks and crevices in the ball surface. Although this plastic flow increases with the amount of imposed load, the force required to separate the two surfaces varies directly with the area affected. Thus, by maintaining a minimum contact or bearing area between the ball and the seat seal, the force or torque required to break the frictional bond is held to a minimum. With the construction of the invention using a raised annular surface on the seat seal (as at 56 in FIG. 7), the bearing surface is greatly minimized. The seat seal-ball contact areas are also minimized by the construction illustrated in FIGS. 10 and 10A.

The operating torque for the valve may also be minimized by the provision of a slot or a series of spaced slots in the surface 62' of the seat seal, as indicated by the dashed lines 84 in FIGS. 10A and 10B. These slots 84, which are preferably arcuate in shape, prevent a pressure-tight seal across the contact area 76 by affording fluid communication between the interior of the valve (around the ball) and the front side bearing area 73'. These slots need not be large, for example, in the 7" valve described previously, a single slot having a width and depth of about ⅛" has been found adequate. The resulting distribution of internal fluid pressure counter-balances the force exerted as a result of fluid pressure across the back side and the outer periphery of the seat seal thereby decreasing the contact pressure between the ball and the seal in the area 73'. However, proper operation under high load conditions requires some contact between the ball and the seal in the region 76 to afford a distribution of the load on the seal; hence it has not been found satisfactory (except at low pressures and where hydraulic shock is not a problem) to relieve the surface 62' so that no contact between this surface and the ball occurs.

The valve operations described above are with respect to the downstream seat seal where positive sealing action at high pressures is provided between the back side bearing area and the valve seat, between the front side bearing area and the ball, and (unless a fluid path such as the slots 84 is provided) between the lower front side bearing area (76) and the ball. The positive sealing action at high pressures is enhanced by motion of the ball in a downstream direction under the fluid pressure. But downstream motion of the ball partially reduces the amount of preload initially imposed upon the upstream seal. No sealing action is required of the upstream seal and it is desirable to permit high pressure fluid to flow between the upstream seal and the valve housing.

If the seal of FIG. 10A were considered the upstream seal, high pressure fluid would flow past the back side of the seat seal and between the outer periphery of the seat seal and the valve seat surface 41'. This flow is facilitated through downstream motion of the ball under the fluid pressure with the consequent relief of the preload on the upstream seal.

When the valve is closed with normal rapidity, the upstream seal is subjected to a substantial pressure surge caused by water hammer. This pressure surge acting across the back side of the upstream seal, which pressure may be substantially greater than the normal internal fluid pressure because of the water hammer, will tend to cause a torsional twist of the seal about the ball. If this torsional twisting force is sufficiently large it will cause the seal to become permanently deformed. Such excessive torsional twisting will occur before the ball reaches its valve closed position. Excessive torsional twisting of the upstream seal may be prevented by providing adequate clearance between the outer diameter of the seal and the valve housing, which clearance affords relief of the pressure surge and prevents the seal from being wrapped around the ball.

However, it will be recalled that hoop stretching of the seal occurs under high imposed loads so that, with any particular seal and valve seat design, it may not be possible to maintain adequate clearance under high loads. In such case a fluid path may be afforded through providing a notch or slot or a series of spaced notches or slots in the outer periphery of the upstream seal. Since the upstream and downstream seals are preferably identical, such notches or slots may be afforded in the downstream seal as well as in the upstream seal. Square or rectangular slots may be used if the seal material is not notch-sensitive; otherwise arcuate slots may be used. The notches or slots should not extend radially inward past the chamfered portion located on the back side of the seal at the outer diameter, e.g., the chamfered portion 71 of FIG. 10 and the chamfered portion of the surface 49 of FIG. 7.

Figure 12:
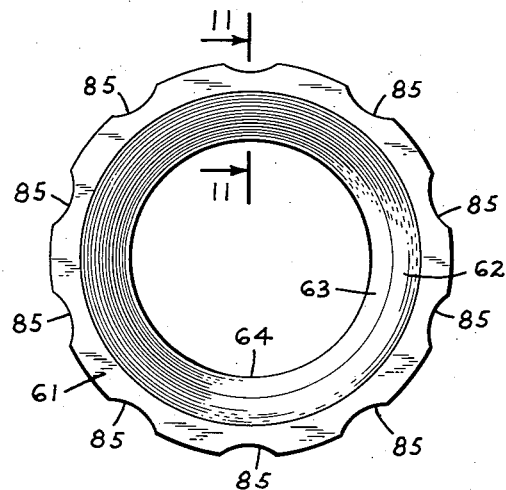
FIG. 12 is a front elevational view of the seat seal of FIG. 11.
Figure 11:
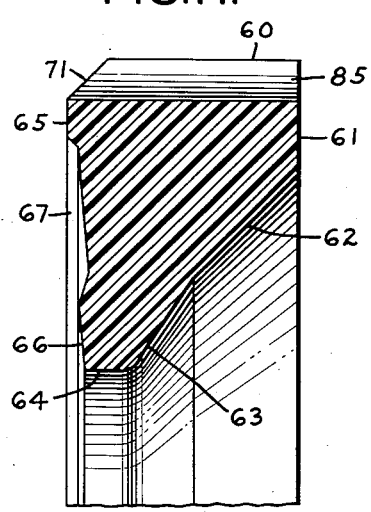
FIG. 11 is a partial sectional view taken along the line 11—11 of FIG. 12 and being similar to FIG. 10 and illustrating a further modification of the seat seal of the invention.

A seat seal of the type shown in FIG. 10 but with an arcuate pressure surge relieving slot is illustrated in FIGS. 11 and 12. The reference numeral 85 designates the arcuate slot, the other reference numerals corresponding to FIG. 10.

The principles of the invention are also applicable to three-way valves, and a three-way ball valve constructed in accordance with the invention is illustrated in FIG. 13. The valve of FIG. 13 comprises a generally cylindrical valve body or housing 86, a generally cylindrical valve bonnet 87 connected to the valve body by means of peripherally spaced bolts 88, and a self-centering or floating ball 89 located in and substantially filling the cavity afforded within the valve body and bonnet. The valve body is provided with a generally cylindrical opening 90 forming an end port A and a similar opening 91 forming a common port C. The valve bonnet 87 is provided with a similar opening 92 forming an end port B. The end ports A and B are in axial alignment and are disposed at right angles with respect to the common port C.

The ball 89 is provided with a curved cylindrical passage 93 the ends of which are disposed at 90° with respect to each other. The common port C may be connected to either of the two ends ports or closed off from both end ports by rotating the ball 89 about an axis concentric with the common port C so as to align the angle passage 93 of the ball to afford the desired communication or lack of communication. The ball 89 is provided with a square sided opening 94 adapted to accommodate a similarly shaped end 95 of a valve operating stem 96. The stem 96 acts in a hole provided in the top of the valve body 86 and may be rotated by any desired means (not shown) in order to effect rotation of the ball.

Suitable fluid pressure seals such as O rings are provided between mating surfaces of the valve body and bonnet and between the valve body and valve stem, as shown at 97 and 98.

The valve body is provided with a radially extending annular shoulder 99 and an axially extending annular shoulder 100 forming an annular valve seat 101. The valve bonnet is provided with a radially extending annular shoulder 102 and an axially extending annular shoulder 103 forming an annular valve seat 104 identical to the valve seat 101 but oppositely disposed. The valve seats 101 and 104 accommodate annular seat seals 105 and 106, respectively. The seat seals 105 and 106 are identical but oppositely disposed so that each presents a corresponding face to the ball.

Figure 14:
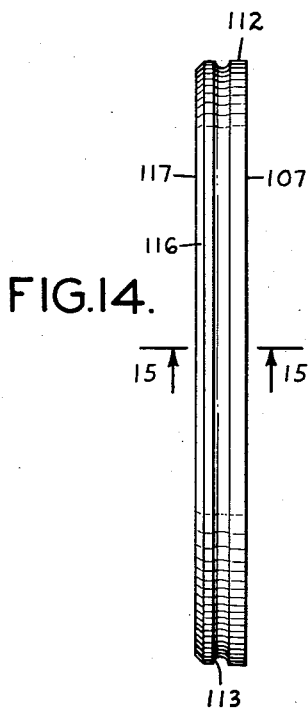
FIG. 14 is a side elevational view of one of the seat seals of the valve of FIG. 13.
Figure 15:
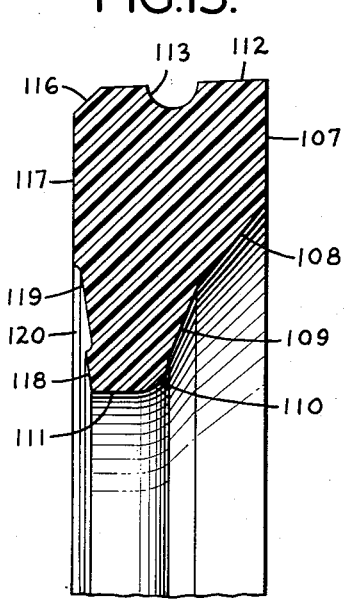
FIG. 15 is an enlarged partial sectional view of the seat seal of FIG. 14 taken along the line 15—15 of FIG. 14.

The seat seals are shown in detail in FIGS. 14 and 15. These seals are similar to the seals previously described for the two-way ball valve, with certain differences, as will be discussed below. In the two-way ball valve the relative radial positions of the seat seal fulcrum point and centroid may be varied as desired, but in the three-way ball valve the fulcrum point should be located substantially radially inwardly of the centroid. In any event, the fulcrum point should be located radially inwardly of the midpoint of the seal, for reasons which will be discussed below.

Referring to FIGS. 14 and 15, the front side of the seal (the side facing the ball) is formed by a vertical surface 107, an angled surface 108, a differently angled surface 109 and a raised annular surface or bead 110. The bead 110 forms the front side bearing surface corresponding to the surface 56 of FIG. 7. If desired (and especially for very high pressure applications) the bead 110 may be omitted so that the front side of the seat seal will correspond to the front side of the seat seal of FIG. 10. The inner diameter of the seat seal is formed by horizontal surface 111, the diameter of which corresponds to the adjacent ball passage diameter.

The outer diameter of the seat seal is formed by a surface 112 which is angled inwardly slightly (e.g., 2°) toward the back side. The surface 112 is provided with an annular arcuate slot 113 which is adapted to receive an O ring 114 (or 115), as shown in FIG. 13. Alternatively, the O ring slot may be provided in the valve seat surface 100 (or 103) and act against the surface 112 to afford sealing action as described below. The back portion of the surface 112 is chamfered as shown at 116.

The back side of the seat seal is formed by an outer annular vertical surface 117, an inner annular angled surface 118, and an annular recessed surface 119 forming an annular relief chamber 120 which affords the debris-removing pumping chamber, as previously described. The surface 118 is the back side bearing area corresponding to the surface 53 of FIG. 7 and the surface 66 of FIG. 10.

The sealing action in the three-way ball valve of the invention can conveniently be described in connection with the schematic force diagrams of FIGS. 16A and 16B, which illustrate the seal 105, valve seat 101, and ball 89 of FIG. 13 under different pressure conditions. In these figures, the vector P equals the axial resultant pressure thrust caused by the differential valve pressure acting on the valve seat. The vector P' is equal to but opposite in direction to the vector P. The vector R equals the reaction of the P force on the valve body. The vectors F and F' are the reaction forces of the seal against the ball, causing sealing. The various vectors could be expressed numerically in pounds per circumferential inch.

The three-way ball valve seat seal must seal against pressure from both directions, i.e., with any combination of differential pressures across the three valve ports, pressure must not leak past either of the two-valve seat seals while the valve is in the closed position. In accordance with the invention, the seat seals of the three-way valve afford tighter seals with increasing differential pressures.

Considering first the situation in which the end ports have equal low pressures with a high pressure in the common port, the valve sealing operation is illustrated in FIG. 16A. The high pressure in the common port seeks to leak out past the sealing lip or the O ring. Initially, the seat seals have been preloaded between the valve body and the ball, causing the seat seals to rotate and pivot about their fulcrum points. This action causes the seals to be "wound up" torsionally and results in a positive seal lip-ball bearing pressure. For a 7" ball valve, this pressure might amount, for example, to about 100–200 pounds per circumferential inch of seal lip.

When the differential pressure acts on the seal, the preload bearing pressure stops any low or initial pressure from leaking past the seal lip. The O ring also stops pressure leakage. The differential pressure acting on the seal tends to force the main body of the seal longitudinally outward (vector P). However, since the fulcrum point in contact with the valve seat is located radially inward of the radial midpoint of the seal, the reaction force (vector R) causes the seal to pivot about the fulcrum point in a counterclockwise direction (FIG. 16A). This causes the sealing lip 110 to try to advance further into the ball, increasing the sealing lip-ball bearing pressure (vector F). The greater the pressure differential the greater will be the sealing lip-ball bearing pressure. In other words, the higher the differential pressure the tighter will be the seal. By "radial midpoint of the seal" is meant the intersection with the back face of the seal of the perpendicular bisector of the line joining the center of the front side bearing area 110 and the center of the contact area between the O ring and the valve seat 100.

By moving the radial location of the fulcrum point the sealing lip-ball bearing pressure may be changed for a given pressure differential on the valve.

With both end ports at equal low pressure, the ball does not move but the seat seal lips (or corresponding plane surfaces in the absence of lips) just bear tighter and tighter as the pressure increases.

When the common port pressure is less than the end port pressures, but with the end port pressures equal, the situation illustrated in FIG. 16B prevails. Because of the initial torsional preload, any initial pressure trying to get past the sealing lips toward the common port is stopped by the preload seat seal lip-ball bearing pressure. The O ring also seals against leakage. As the differential pressure increases, the seat seal tends to move longitudinally toward the ball (vector P'), increasing the sealing pressure of the lip on the ball. Due to the wedging action of the seat seal against the ball, large differential pressures cause the seat seal to hoop stretch radially outward, keeping the O ring from blowing out as the seat seal rotates, which rotation will continue with increasing differential pressures until the second contact area of the front face of the seal contacts the ball. Thereafter, seat seal deformation is mostly hoop stretching, holding the O ring more tightly.

In this case the seat seal effectively moves toward the ball after the seal preload has been exceeded by differential pressure. The fulcrum point loses contact with the valve body. When the differential pressure is equalized (by opening the valve) the seat seal returns to its original preload condition.

When the end ports A and B differ in pressure from each other and from the common port, the ball will move horizontally. If the pressure in end port A is greater than in the common port, which pressure in turn is greater than in end port B, then the seat seal next to port A will advance toward the ball (as FIG. 16B) and cause positive sealing. The seat seal next to end port B, however, will act as described in connection with FIG. 16A and, in addition, the ball will transmit a torsional twisting force to this seal similar to that previously described for a two-way straight through valve, further increasing the sealing action of this seal. In this connection, it will be recalled that the pressure differential across a two-way straight through valve causes positive sealing on the downstream seat seal (compare FIG. 10B).

If one of the end ports of the three-way ball valve of FIG. 13 were closed off (except for a vent to the low pressure one of the remaining ports) there would result a large angle (90°) ball valve. In such a valve there would be no net ball pressure area thrust and the only place when operating torque would arise would be in the self-sealing action, as described in connection with FIG. 16A. By locating the seal fulcrum point for optimum sealing and low torque, the operating torque will be a small fraction of that required for similar ball valves using conventional ball valve seal designs. For example, a typical 14" angle ball valve with a conventional two-way seal design and a given pressure differential might require a torque of the order of 200,000 inch pounds. A 14" angle ball valve of the type shown in FIG. 13 with one port closed except for a vent to the low pressure port and acting against the same pressure differential might require a torque of the order of 40,000 inch pounds.

When the seat seal material is highly crystalline in nature, e.g., Nylatron GS, it is desirable that the O ring grooves 113 be machined with a full radius, as shown, rather than with sharp corners in order to prevent seal breakage under pressure by relieving stress concentrations.

In the valve of FIG. 13, when pressure appears at the common port after pressure application at the end ports, high pressure or incompressible fluid may be trapped between the fulcrum point and the O ring seal, as indicated at 121 in FIG. 17. Such trapped fluid will exert a force F1 across the back face of the seal when the seal moves axially under action of the common port pressure. A force F1' will be exerted across the front face of the seal by pressure from the common port. The force F1' tends to neutralize the force F1 and sometimes may fully neutralize the effect of force F1 where equal pressures exist on both sides of the seal. In such case the force R1 exerted across the front side of the seal and tending to unload or move the seal away fro the ball may cause leakage. This condition can be corrected by locating the fulcrum point closer to the end port opening. However, this is undesirable since it lowers seal flexibility. A preferable arrangement is to provide a fluid passage across the fulcrum area to prevent trapping of high pressure fluid on the back side of the seal. Such a passage is shown at 122 in FIG. 17. A series of spaced slots may be provided. Another alternative is to allow the O ring to extrude out a predetermined amount, thus decreasing the pressure on the back side of the seal by increasing the volume of the chamber 121 containing this fluid.

By way of illustration, the relief chamber 123 in the back side of the seat seal in FIG. 17 has been shown to be generally of a shape such as is shown in FIG. 7 rather than as is shown in FIGS. 10 or 15.

While the invention has been described in connection with specific embodiments thereof and in specific uses, various modifications thereof will occur to those skilled in the art without departing from the spirit and scope of the invention as set forth in the appended claims.

What is claimed is:

1. A valve, comprising a valve housing having inlet and outlet ports; a rotatable ball disposed in the space within said housing and having a fluid passage arranged in one rotational position of said ball to provide communication between said ports, said ball, in another rotational position thereof, being arranged to prevent communication between said ports; said housing having an annular valve seat adjacent and concentric with each port, each of said seats comprising an annular radially extending surface and an annular axially extending surface; and a pair of annular seat seal rings each disposed in one of said seats and arranged to hold said ball therebetween, said seal rings being formed from a material having substantial flexural stiffness and hardness and a relatively high modulus of elasticity, each of said seal rings having an inner diameter corresponding to the diameter of said passage, an outer diameter corresponding to the diameter of said axially extending surface, a front face extending radially and inwardly from said inner diameter and arranged to contact said ball only over a first limited annular area adjacent said inner diameter under light load conditions and over said first area and a second limited annular area under substantial load conditions, said second area being radially and inwardly spaced from said first area, and a rear face extending radially and outwardly from said inner diameter, said rear face having a circular ring radially spaced from said outer diameter and arranged to contact said radially extending surface as a fulcrum and an annular bearing area adjacent said inner diameter and axially spaced from said radially extending surface under light load conditions but contacting said radially extending surface under substantial load conditions by torsional twisting of said seal about said fulcrum.

2. A valve, comprising a valve housing having inlet and outlet ports; a rotatable ball disposed in the space within said housing and having a fluid passage arranged in one rotational position of said ball to provide communication between said ports, said ball, in another rotational position thereof, being arranged to prevent communication between said ports; said housing having an annular valve seat adjacent and concentric with said outlet port, said seat comprising an annular radially extending surface and an annular axially extending surface; an annular seat seal ring disposed in said seat and arranged to contact said ball, said seal ring being formed from a material having substantial flexural stiffness and hardness and a relatively high modulus of elasticity, said seal ring having an inner diameter corresponding to the diameter of said passage, an outer diameter corresponding to the diameter of said axially extending surface, a front face extending radially and inwardly from said inner diameter and arranged to contact said ball only over a first limited annular area adjacent said inner diameter under light load conditions and over said first area and a second limited annular area under substantial load conditions, said second area being radially and inwardly spaced from said first area, and a rear face extending radially and outwardly from said inner diameter, said rear face having a circular ring radially spaced from said outer diameter and arranged to contact said radially extending surface as a fulcrum and an annular bearing area adjacent said inner diameter and axially spaced from said radially extending surface under light load conditions but contacting said radially extending surface under substantial load conditions by torsional twisting of said seal about said fulcrum.

3. A valve, comprising a valve housing having inlet and outlet ports; a rotatable ball disposed in the space within said housing and having a fluid passage arranged in one rotational position of said ball to provide communication between said ports, said ball, in another rotational position thereof, being arranged to prevent communication between said ports; said housing having an annular valve seat adjacent and concentric with one of said ports, said seat comprising an annular radially extending surface and an annular axially extending surface; and an annular seat seal ring disposed in said seat and arranged to contact said ball, said seal ring being formed from a material having substantial flexural stiffness and hardness and a relatively high modulus of elasticity, said seal ring having an inner diameter corresponding to the diameter of said passage, an outer diameter corresponding to the diameter of said axially extending surface, a front face extending radially and inwardly from said inner diameter and arranged to contact said ball only over a first limited annular area adjacent said inner diameter under light load conditions and over a limited annular region including said first area and a second limited annular area under substantial load conditions, said second area being radially and inwardly spaced from said first area, and a rear face extending radially and outwardly from said inner diameter, said rear face having a circular ring radially spaced from said outer diameter and arranged to contact said radially extending surface as a fulcrum and an annular bearing area adjacent said inner diameter and axially spaced from said radially extending surface under light load conditions but contacting said radially extending surface under substantial load conditions by torsional twisting of said seal about said fulcrum, contact between said ball and said second area and between said annular bearing area and said radially extending surface occurring at substantially the same loads.

4. A valve, comprising a valve housing having inlet and outlet ports; a rotatable ball disposed in the space within said housing and having a fluid passage arranged in one rotational position of said ball to provide communication between said ports, said ball, in another rotational position thereof, being arranged to prevent communication between said ports; said housing having an annular valve seat adjacent and concentric with one of said ports, said seat comprising an annular radially extending surface and an annular axially extending surface; and an annular seat seal ring disposed in said seat and arranged to contact said ball, said seal ring being formed from a material having substantial flexural stiffness and hardness and a relatively high modulus of elasticity, said seal ring having an inner diameter corresponding to the diameter of said passage, an outer diameter corresponding to the diameter of said axial extending surface, a front face extending radially and inwardly from said inner diameter and arranged to contact said ball only over a first limited annular area adjacent said inner diameter under light load conditions and over a limited annular region including said first area under substantial load conditions, and a rear face extending radially and outwardly from said inner diameter, said rear face having a circular ring radially spaced from said outer diameter and arranged to contact said radially extending surface as a fulcrum and an annular bearing area adjacent said inner diameter and axially spaced from said radially extending surface under light load conditions but contacting said radially extending surface under substantial load conditions by torsional twisting of said seal about said fulcrum, said rear face having an annular relief chamber between said inner diameter and said fulcrum from which solid particles are expelled under said torsional twisting action when said substantial load is applied.

5. A valve as set forth in claim 4 in which said relief chamber is formed as an annular inwardly extending recess in said rear face, said recess having a radial extent substantially equal to the spacing between said bearing area and said fulcrum.

6. A valve, comprising a valve housing having inlet and outlet ports; a rotatable ball disposed in the space within said housing and having a first fluid passage arranged in one rotational position of said ball to provide communication between said ports, said ball, in another rotational position thereof, being arranged to prevent communication between said ports; said housing having an annular valve seat adjacent and concentric with said outlet port, said seat comprising an annular radially extending surface and an annular axially extending surface; and an annular seat seal ring disposed in said seat and arranged to contact said ball, said seal ring formed from a material having substantial flexural stiffness and hardness and a relatively high modulus of elasticity, said seal ring having an inner diameter corresponding to the diameter of said first passage, an outer diameter corresponding to the diameter of said axially extending surface, a front face extending radially and inwardly from said inner diameter and arranged to contact said ball only over a first limited annular area adjacent said inner diameter under light load conditions and over a region including said first area and a second limited annular area under substantial load conditions, said second area being radially and inwardly spaced from said first area and having a second fluid passage providing communication between the inner and outer radial edges of said second area to prevent fluid-tight sealing contact between said ball and said second area, and a rear face extending radially and outwardly from said inner diameter, said rear face having a circular ring radially spaced from said outer diameter and arranged to contact said radially extending surface as a fulcrum and an annular bearing area adjacent said inner diameter and axially spaced from said radially extending surface under light load conditions but contacting said radially extending surface under substantial load conditions by torsional twisting of said seal about said fulcrum.

7. A valve as set forth in claim 6 in which said second fluid passage is formed by a slot in said second area of said front face of said seat seal.

8. A valve as set forth in claim 6 in which said second fluid passage is formed by a series of transversely spaced slots in said second area of said front face of said seat seal.

9. A valve, comprising a valve housing having inlet and outlet ports; a rotatable ball disposed in the space within said housing and having a first fluid passage arranged in one rotational position of said ball to provide communication between said ports, said ball, in another rotational position thereof, being arranged to prevent communication between said ports; said housing having an annular valve seat adjacent and concentric with each port, each of said seats comprising an annular radially extending surface and an annular axially extending surface; and a pair of annular seat seal rings each disposed in one of said seats and arranged to hold said ball therebetween, said seal rings being formed from a material having substantial flexural stiffness and hardness and a relatively high modulus of elasticity, each of said seal rings having an inner diameter corresponding to the diameter of said first passage, an outer diameter corresponding to the diameter of said axially extending surface but inclined relative thereto to accommodate hoop stresses in the downstream seal ring, a front face extending radially and inwardly from said inner diameter and arranged to contact said ball only over a first limited annular area adjacent said inner diameter under light load conditions and over a limited annular region including said first area and a second limited annular area under substantial load conditions, said second area being radially and inwardly spaced from said first area, and a rear face extending radially and outwardly from said inner diameter, said rear face having a circular ring radially spaced from said outer diameter and arranged to contact said radially extending surface as a fulcrum, and an annular bearing area adjacent said inner diameter and axially spaced from said radially extending surface under light load conditions but contacting said radially extending surface under substantial load conditions by torsional twisting of said seal about said fulcrum, said incline of said outer diameter providing a second fluid passage extending across the rear face and outer diameter of the upstream seal ring.

10. A valve, comprising a valve housing having inlet and outlet ports; a rotatable ball disposed in the space within said housing and having a fluid passage arranged in one rotational position of said ball to provide communication between said ports, said ball, in another rotational position thereof, being arranged to prevent communication between said ports; said housing having an annular valve seat adjacent and concentric with each port, each of said seats comprising an annular radially extending surface and an annular axially extending surface; and a pair of annular seat seal rings each disposed in one of said seats and arranged to hold said ball therebetween, said seal rings being formed from a material having substantial flexural stiffness and hardness and a relatively high modulus of elasticity, each of said seal rings having an inner diameter corresponding to the diameter of said passage, an outer diameter corresponding to the diameter of said axially extending surface, a front face extending radially and inwardly from said inner diameter and arranged to contact said ball only over a first limited annular area adjacent said inner diameter under preload conditions and over a limited annular region including said first area and a second limited annular area under substantial load conditions lying between about one-tenth and one-fifth of the maximum rated load on the downstream seat seal, said second area being radially and inwardly spaced from said first area, and a rear face extending radially and outwardly from said inner diameter, said rear face having a circular ring radially spaced from said outer diameter and arranged to contact said radially extending surface as a fulcrum, and an annular bearing area adjacent said inner diameter and axially spaced from said radially extending surface under preload conditions but contacting said radially extending surface under said substantial load conditions by torsional twisting of said seal about said fulcrum, said fulcrum of the downstream seal moving in a radial direction along said radially extending surface as the load on said downstream seal is increased.

11. A valve as set forth in claim 2 in which a plurality of narrow radially spaced annular slots are provided in said radially extending surface, said slots lying in a portion of said radially extending surface contacted by said annular bearing area under substantial load conditions.

12. A valve as set forth in claim 2 in which said radially extending surface and said rear face of said seat seal ring have corresponding limited portions angularly disposed relative to the balance of said radially extending surface and arranged to mate under substantial load conditions.

13. A valve, comprising a valve housing having first and second axially aligned end ports and a common port; a rotatable ball disposed in the space within said housing and having a fluid passage arranged in a first rotational position of said ball to provide communication between said common port and said first end port only, in a second rotational position of said ball to provide communication between said common port and said second end port only, and in a third rotational position of said ball to prevent communication between said common port and both of said end ports; said housing having an annular valve seat adjacent and concentric with each of said end ports, each of said seats comprising an annular radially extending surface and an annular axially extending surface; a pair of annular seat seal rings each disposed in one of said seats and arranged to hold said ball therebetween, said seal rings being formed from a material having substantial flexural stiffness and hardness and a relatively high modulus of elasticity, each of said seal rings having an inner diameter corresponding to the diameter of said passage, an outer diameter corresponding to the diameter of said axially extending surface, a rear face, a front face extending radially and inwardly from said inner diameter and arranged to contact said ball only over a first limited annular area adjacent said inner diameter under preload conditions and over a limited annular region including said first area under substantial load conditions urging said ball and said seal ring into contact, said rear face extending radially and generally outwardly from said inner diameter, said rear face having a circular ring located between said inner diameter and the radial midpoint of said seal ring, said circular ring being arranged to contact said radially extending surface as a fulcrum when load is exerted on the front face of said seal ring, said rear face having an annular bearing area adjacent said inner diameter and axially spaced from said radially extending surface under preload conditions but contacting said radially extending surface under substantial load conditions on said front face by torsional twisting of said seal ring about said fulcrum; and separate sealing means affording sealing contact between said outer diameter of each of said seal rings and a respective one of said axially extending surfaces under all load conditions.

14. A valve, comprising a valve housing having first and second axially aligned end ports and a common port; a rotatable ball disposed in the space within said housing and having a fluid passage arranged in a first rotational position of said ball to provide communication between said common port and said first end port only, in a second rotational position of said ball to provide communication between said common port and said second end port only, and in a third rotational position of said ball to prevent communication between said common port and both of said end ports; said housing having an annular valve seat adjacent and concentric with each of said end ports, each of said seats comprising an annular radially extending surface and an annular axially extending surface; a pair of annular seat seal rings each disposed in one of said seats and arranged to hold said ball therebetween, said seal rings being formed from a material having substantial flexural stiffness and hardness and a relatively high modulus of elasticity, each of said seal rings having an inner diameter corresponding to the diameter of said passage, an outer diameter corresponding to the diameter of said axially extending surface, a rear face, a front face extending radially and inwardly from said inner diameter and arranged to contact said ball only over a first limited annular area adjacent said inner diameter under preload conditions and over a limited annular region including said first area and a second limited annular area under substantial load conditions urging said ball and said seal ring into contact, said second area being radially and inwardly spaced from said first area, said rear face extending radially and generally outwardly from said inner diameter, said rear face having a circular ring located between said inner diameter and the radial midpoint of said seal ring, said circular ring being arranged to contact said radially extending surface as a fulcrum when load is exerted on the front face of said seal ring, said rear face having an annular bearing area adjacent said inner diameter and axially spaced from said radially extending surface under preload conditions but contacting said radially extending surface under substantial load conditions on said front face by torsional twisting of said seal ring about said fulcrum, said outer diameter having an annular groove; and an O ring seal in each of said grooves and arranged to afford sealing contact between said outer diameter of each of said seal rings and a respective one of said axially extending surfaces under all load conditions.

15. A valve, comprising a valve housing having first and second axially aligned end ports and a common port; a portable ball disposed in the space within said housing and having a first fluid passage arranged in a first rotational position of said ball to provide communication between said common port and said first end port only, in a second rotational position of said ball to provide communication between said common port and said second end port only, and in a third rotational position of said ball to prevent communication between said common port and both of said end ports; said housing having an annular valve seat adjacent and concentric with each of said end ports, each of said seats comprising an annular radially extending surface and an annular axially extending surface; a pair of annular seat seal rings each disposed in one of said seats and arranged to hold said ball therebetween, said seal rings being formed from a material having substantial flexural stiffness and hardness and a relatively high modulus of elasticity, each of said seal rings having an inner diameter corresponding to the diameter of said first passage, an outer diameter corresponding to the diameter of said axially extending surface, a rear face, a front face extending radially and inwardly from said inner diameter and arranged to contact said ball only over a first limited annular area adjacent said inner diameter under preload conditions and over a limited annular region including said first area and a second limited annular area under substantial load conditions urging said ball and said seal ring into contact, said second area being radially and inwardly spaced from said first area, said rear face extending radially and generally outwardly from said inner diameter, said rear face having a circular ring located between said inner diameter and the radial midpoint of said seal ring, said circular ring being arranged to contact said radially extend surface as a fulcrum when load is exerted on the front face of said seal ring, said rear face having an annular bearing area adjacent said inner diameter and axially spaced from said radially extending surface under preload conditions but contacting said radially extending surface under substantial load conditions on said front face by torsional twisting of said seal ring about said fulcrum, said rear face having a second fluid passage extending radially of and across said circular ring to provide fluid communication between the areas of said rear face lying on both sides of said circular ring; and separate sealing means affording sealing contact between said outer diameter of each of said seal rings and a respective one of said axially extending surfaces under all load conditions.

16. A valve as set forth in claim 15 in which said second fluid passage is formed as a series of radially extending transversely spaced slots in said rear face.

17. A valve, comprising a valve housing having first and second ports having axes disposed at substantial angles; a rotatable ball disposed in the space within said housing and having a first fluid passage arranged in a first rotational position of said ball to provide communication between said ports, and in a second rotational position of said ball to prevent communication between said ports; said housing having a pair of annular valve seats concentric with one of said ports, one of said valve seats being adjacent said one port and the other valve seat being axially spaced therefrom, each of said seats comprising an annular radially extending surface and an annular axially extending surface; a pair of annular seat seal rings each disposed in one of said seats and arranged to hold said ball therebetween, said seal rings being formed from a material having substantial flexural stiffness and hardness and a relatively high modulus of elasticity, each of said seal rings having an inner diameter corresponding to the diameter of said first passage, an outer diameter corresponding to the diameter of said axially extending surface, a rear face, a front face extending radially and inwardly from said inner diameter and arranged to contact said ball only over a first limited annular area adjacent said inner diameter under preload conditions and over a limited annular region including said first area and a second limited annular area under substantial load conditions urging said ball and said seal ring into contact, said second area being radially and inwardly spaced from said first area, said rear face extending radially and generally outwardly from said inner diameter, said rear face having a circular ring located between said inner diameter and the radial midpoint of said seal ring, said circular ring being arranged to contact said radially extending surface as a fulcrum when load is exerted on the front face of said seal ring, said rear face having an annular bearing area adjacent said inner diameter and axially spaced from said radially extending surface under preload conditions but contacting said radially extending surface under substantial load conditions on said front face by torsional twisting of said seal ring about said fulcrum; separate sealing means affording sealing contact between said outer diameter of each of said seal rings and a respective one of said axially extending surfaces under all load conditions; and a second fluid passage interconnecting the interior of said housing in the region of said other valve seat and said one port to afford pressure equalization between said region of said housing and said one port.

18. A structure as set forth in claim 2 in which said rear face is provided with a shoulder forming said circular ring and in which said fulcrum is located between the radial midpoint of said rear face and said outer diameter.

19. A structure as set forth in claim 2 in which said front face has a raised annular lip adjacent said inner diameter, a first inclined, substantially flat portion extending radially and inwardly of said lip and a second but differently inclined, substantially flat portion extending radially and inwardly of said first inclined portion, said first limited annular area lying along said raised annular lip and said second area lying along said second inclined portion.

20. A structure as set forth in claim 2 in which said front face is formed from a first inclined, substantially flat portion extending radially and inwardly from said inner diameter and a second but differently inclined, substantially flat portion extending radially and inwardly from said first portion to said outer diameter, said first limited annular area lying along said first portion and said second area lying along said second portion.

21. A structure as set forth in claim 2 in which said rear face is provided with a shoulder forming said circular ring and in which said fulcrum is located between the radial midpoint of said rear face and said inner diameter but adjacent said radial midpoint.

22. A structure as set forth in claim 2 in which said outer diameter is provided with a narrow annular flange adjacent the inner edge thereof, said flange having a diameter greater than that of the remainder of said outer diameter.

References Cited in the file of this patent

UNITED STATES PATENTS

| | | |
|---|---|---|
| 2,297,161 | Newton | Sept. 29, 1942 |
| 2,762,601 | Clade | Sept. 11, 1956 |
| 2,788,016 | Scherer | Apr. 9, 1957 |
| 2,858,098 | Sanctuary | Oct. 28, 1958 |
| 2,890,856 | Clade | June 16, 1959 |

UNITED STATES PATENT OFFICE
CERTIFICATION OF CORRECTION

Patent No. 2,989,990                                                  June 27, 1961

Harold E. Bass et al.

It is hereby certified that error appears in the above numbered patent requiring correction and that the said Letters Patent should read as corrected below.

Column 2, line 7, for "elevantional" read -- elevational --; column 4, line 70, before "contact" insert -- sealing --; column 5, line 46, for "the", second occurrence, read -- a --; line 51, strike out "the"; line 68, for "bock" read -- back --; column 7, line 25, for "connecton" read -- connection --; column 9, line 36, for "ends" read -- end --; column 12, line 16, for "fro mthe" read -- from the --; column 14, line 43, before "formed" insert -- being --; column 17, line 30, for "portable" read -- rotatable --; lines 62 and 63, for "extepid" read -- extending --.

Signed and sealed this 21st day of November 1961.

(SEAL)
Attest:

ERNEST W. SWIDER                                      DAVID L. LADD
Attesting Officer                                    Commissioner of Patents